United States Patent
Chandra Sekar Rao et al.

(10) Patent No.: US 10,866,985 B2
(45) Date of Patent: Dec. 15, 2020

(54) IMAGE-BASED SEARCH AND RECOMMENDATION TECHNIQUES IMPLEMENTED VIA ARTIFICIAL INTELLIGENCE

(71) Applicant: EMC IP Holding Company LLC, Hopkinton, MA (US)

(72) Inventors: Venkata Chandra Sekar Rao, Bangalore (IN); Neeraj Tiwari, Bangalore (IN); Kalpana Razdan, Bangalore (IN); Sumit Gupta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 283 days.

(21) Appl. No.: 16/048,787

(22) Filed: Jul. 30, 2018

(65) Prior Publication Data
US 2020/0034455 A1   Jan. 30, 2020

(51) Int. Cl.
*G06Q 30/00*    (2012.01)
*G06F 16/532*   (2019.01)
(Continued)

(52) U.S. Cl.
CPC .............. *G06F 16/532* (2019.01); *G06K 9/46* (2013.01); *G06K 9/6202* (2013.01); *G06N 5/02* (2013.01); *G06Q 30/0627* (2013.01)

(58) Field of Classification Search
CPC ........................................ G06Q 30/0601–0645
(Continued)

(56) References Cited

U.S. PATENT DOCUMENTS 9,830,561 B2   11/2017  Pruthi et al.
10,043,109 B1 *  8/2018  Du ....................... G06K 9/4652
(Continued)

OTHER PUBLICATIONS

Life: Online: 100 most useful websites: Cream of the crop: With internet activity at an all-time high, online asked specialist journalists to select their favourite sites from across the web. (Dec. 16, 2004). The Guardian Retrieved from https://dialog.proquest.com/professional/docview/246298150?accountid=131444.*
(Continued)

*Primary Examiner* — Resha Desai
(74) *Attorney, Agent, or Firm* — Ryan, Mason & Lewis, LLP

(57) ABSTRACT

Methods, apparatus, and processor-readable storage media for image-based search and recommendation techniques implemented via artificial intelligence are provided herein. An example computer-implemented method includes detecting, in response to a user search query comprising an image, an object in the image by applying one or more artificial intelligence algorithms to the image; determining one or more features of the object by applying the one or more artificial intelligence algorithms to one or more portions of the image containing at least a portion of the object; identifying the detected object as a particular enterprise offering based at least in part on the one or more determined features of the object; determining one or more additional enterprise offerings based at least in part on the identified enterprise offering; outputting, to the user, information pertaining to the identified enterprise offering and information pertaining to the one or more additional enterprise offerings.

20 Claims, 10 Drawing Sheets

(51) Int. Cl.
    *G06N 5/02*         (2006.01)
    *G06K 9/62*         (2006.01)
    *G06K 9/46*         (2006.01)
    *G06Q 30/06*      (2012.01)

(58) Field of Classification Search
    USPC .............................................. 705/26.1–27.2
    See application file for complete search history.

(56) References Cited

U.S. PATENT DOCUMENTS

| | | | |
|---|---|---|---|
| 10,109,051 B1 * | 10/2018 | Natesh | G06K 9/4652 |
| 10,346,893 B1 * | 7/2019 | Duan | G06F 16/24578 |
| 2016/0224664 A1 | 8/2016 | Noren et al. | |
| 2016/0378867 A1 | 12/2016 | Panuganty | |
| 2017/0278135 A1 * | 9/2017 | Majumdar | G06K 9/00362 |

OTHER PUBLICATIONS

Wikipedia, Scale Invariant Feature Transform, https://en.wikipedia.org/w/index.php?title=Scale-invariant_feature_transform&oldid=847912019, Jun. 28, 2018.

* cited by examiner

FIG. 8

```
                                                                                    ⌐800
INPUT: labeled training data as X̃ = {X^(1), X^(2), ..., X^(K)}, K is the total of classes.
CNN ← X̃; % the raw training data are sent into CNN to get extracted feature vectors
F̃ = {F^(1), F^(2), ..., F^(K)}; % the extracted feature vectors are mapped into high-dimensional space to
be % covered by CGC class by class
for i 1 to K do
    D^(i) ← F^(i); % calculate the distance between any of two points in class i
    {T_{i1}, T_{i2}} ← arg min(D^(i)); % find the closet two points from D^(i), marked as T_{i1} and T_{i2}
    F^(i) = F^(i) − {T_{i1}, T_{i2}}; % delete the marked points
    T_{i3} ← FindPtoN(F^(i), {T_{i1}, T_{i2}}); % FindPtoN is a function used to find the minimum distance sum
                                               % from F^(i) to T_{i1} and T_{i2}
    θ_1 ← {T_{i1}, T_{i2}, T_{i3}}; % T_{i1}, T_{i2} and T_{i3} constitute the first plane triangle θ_1
    P_1 = {X | d_{Xθ_1} < Th_i, X ∈ R^n}; % P_1 is the coverage of θ_1 with the covering radius Th_i, called ψ3
                                          % neuron, and dX_{θ1} indicates the distance between X and θ_1
    F^(i) = F^(i) − {T_{i1}, T_{i2}, T_{i3}};
    F^(i) ← ExcludeP(F^(i), P_1); % ExcludeP is a function used to exclude points from F^(i) covered by P_1
    j = 1;
    while F^(i) ≠ ∅ % repeat the steps above until F^(i) is empty
        θ_{j+1} ← FindPtoN(F^(i), θ_j);
        P_{j+1} = {X | d_{Xθ_{j+1}} < Th_i, X ∈ R^n};
        F^(i) ← ExcludeP(F^(i), P_{j+1});
        j = j + 1;
    end
    T_i = ⋃_{j=1}^{m} P_j; % the final CGC of class i is the union of each ψ3 neuron
```

IMAGE-BASED SEARCH AND RECOMMENDATION TECHNIQUES IMPLEMENTED VIA ARTIFICIAL INTELLIGENCE

FIELD

The field relates generally to information processing systems, and more particularly to techniques for conducting searches using such systems.

BACKGROUND

Conventional product searches typically utilize text-based queries, and search results for such searches are generally limited to the metadata stored with the images for each item. The process of tagging each item with accurate search terms is labor-intensive and prone to inaccuracies. Consequently, finding a particular product via conventional searches can be dependent on text, which also can lead to inaccurate results. For example, the relevant text may incorrectly describe one or more features of the desired product, and combinations of multiple keywords may result in over-inclusive search results, adding time and effort to the task of finding the desired product.

SUMMARY

Illustrative embodiments of the invention provide image-based search and recommendation techniques implemented via artificial intelligence. An exemplary computer-implemented method can include detecting, in response to a user search query comprising an image, an object in the image by applying one or more artificial intelligence algorithms to the image. The method can also include determining one or more features of the object by applying the one or more artificial intelligence algorithms to one or more portions of the image containing at least a portion of the object, and identifying the detected object as a particular enterprise offering based at least in part on the one or more determined features of the object. Further, the method can also include determining one or more additional enterprise offerings based at least in part on the identified enterprise offering, and outputting, to the user, information pertaining to the identified enterprise offering and information pertaining to the one or more additional enterprise offerings.

Illustrative embodiments can provide significant advantages relative to conventional search and recommendation arrangements. For example, challenges associated with the limitations of inaccurate text-based queries are overcome through the use of computer-aided visual recognition of physical features and characteristics of a specific product captured in a query image. Such a system can return relevant products that are accurate in terms of physical features and characteristics, as opposed to merely text-based descriptions, which can often be more general and inclusive of multiple varying products. Accordingly, such a system can lead to a smoother path of purchasing, as well as increase in user engagement and conversion rate.

These and other illustrative embodiments described herein include, without limitation, methods, apparatus, systems, and computer program products comprising processor-readable storage media.

BRIEF DESCRIPTION OF THE DRAWINGS

FIG. 8 shows example pseudocode for convolutional neural network (CNN) execution in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
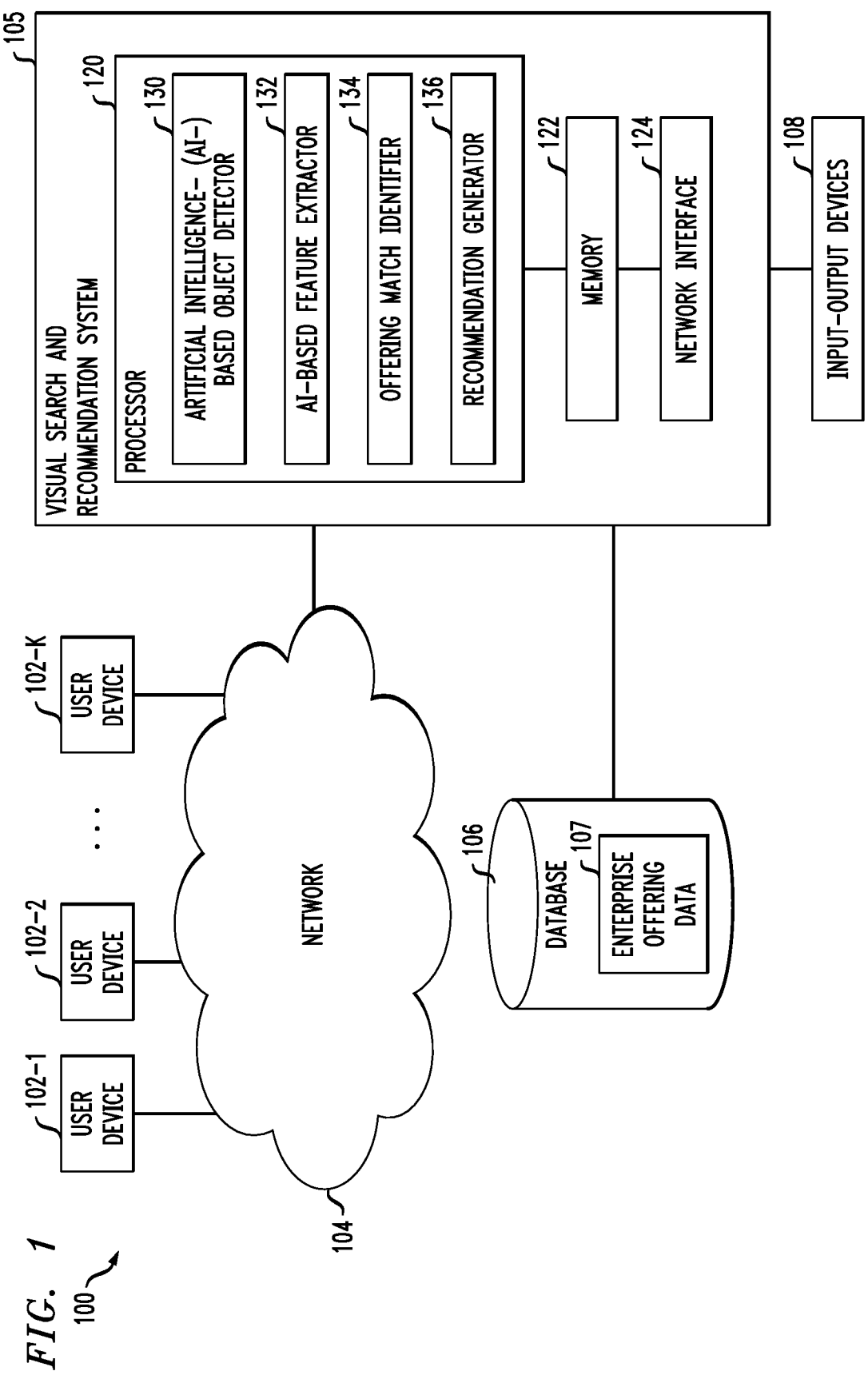
FIG. 1 shows an information processing system configured for image-based search and recommendation techniques implemented via artificial intelligence in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a visual search and recommendation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The visual search and recommendation system 105 has an associated database 106 configured to store enterprise offering data 107 illustratively comprising information pertaining to various offerings of an enterprise, such as enterprise products, enterprise services, etc.

The database 106 in the present embodiment is implemented using one or more storage systems associated with the visual search and recommendation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the visual search and recommendation system 105 are input-output devices 108, which illustratively comprise keyboards, displays or other types of input-output devices in any combination. Such input-output devices are used to support one or more user interfaces to the visual search and recommendation system 105, as well as to support communication between the visual search and recommendation system 105 and other related systems and devices not explicitly shown.

The visual search and recommendation system 105 in the FIG. 1 embodiment is assumed to be implemented using at least one processing device. Each such processing device generally comprises at least one processor and an associated memory, and implements one or more functional modules for controlling certain features of the visual search and recommendation system 105.

More particularly, the visual search and recommendation system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the visual search and recommendation system 105 to communicate over the network 104 with the user devices 102, and illustratively comprises one or more conventional transceivers.

The processor 120 further comprises an AI-based object detector 130, an AI-based feature extractor 132, an offering match identifier 134 and a recommendation generator 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the AI-based object detector 130, AI-based feature extractor 132, offering match identifier 134 and recommendation generator 136 may be implemented at least in part in the form of software that is stored in memory 122 and executed by processor 120.

It is to be understood that the particular set of elements shown in FIG. 1 for performing image-based searches and provided recommendations related thereto involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the visual search and recommendation system 105 can be eliminated and associated elements such as AI-based object detector 130, AI-based feature extractor 132, offering match identifier 134 and recommendation generator 136 can be implemented elsewhere in the computer network 100.

An exemplary process utilizing AI-based object detector 130, AI-based feature extractor 132, offering match identifier 134 and recommendation generator 136 of the visual search and recommendation system 105 in computer network 100 will be described in more detail, for example, with reference to the flow diagram of FIG. 9.

As detailed herein, one or more embodiments of the invention include enabling users/customers to search using a query image. Such a query image can be, for example, uploaded or inserted via a uniform resource locator (URL). The results returned by the system can include top-ranked products from one or more product catalogs of an enterprise, with rankings based at least in part on attributes such as color, shape, patterns, etc. Additionally, as also detailed herein, at least one embodiment of the invention includes recommending one or more visually similar, related, and/or supplementary products from the one or more product catalogs to the searching user/customer. Such an embodiment can include identifying one or more visually similar, related, and/or supplementary products (from the catalogs) based at least in part on the query image searched and user/customer behavior.

In one or more embodiments of the invention, data acquisition stages can be carried out. For example, master data regarding user/customer, products and locations can be obtained and processed. Additionally, one or more enterprise websites can be searched, and images can be downloaded therefrom and stored for processing. Further, products identified in such searching can be categorized into different segments.

The techniques and systems described herein can help serve as an ecosystem for visual search and recommendation, thus acting as a base layer for any application and/or web-based search which can be integrated with such an ecosystem. Additionally, at least one embodiment of the invention includes learning imaged-based search patterns and providing customized pages for subsequent visits by searching users/customers. As also detailed herein, one or more embodiments of the invention include transforming a 2D image (such as a query image) to a multi-dimensional figure, and capturing features from multiple angles via the use of one or more customized algorithms. Such algorithms, as further detailed in connection with FIG. 5, for example, include grouping regions using edges and identifying depth by removing strong edges.

By way merely of illustration and not limitation, consider the following example use case implementation of an embodiment of the invention. A customer captures an image, via the camera of his or her smart phone, of a targeted product for which the customer desires to learn information (and/or prepare to purchase). The image is uploaded via a software application and/or a relevant web-based portal, and image recognition operations can be carried out to compare (on a pixel-by-pixel basis, for example) the captured image against images from a pre-populated product image store of known products. Such image recognition operations can include strong similarity engine checks for both high-level details (such as color, dimensions, etc.) and low-level details (such as patterns including the distance between lines in a carry bag, the distance between keys, the distance from an edge to a logo, the size of a logo, etc.).

In addition, such image recognition operations can handle and/or execute on images with arbitrary complex backgrounds, extreme perspective variations, partial views, poor lighting, semantic segmentations (such as identifying a laptop which is on chair, etc.), and can also search a 2D query image against 3D-trained data for accurate results. Upon identifying a positive match, information regarding the identified product can be gathered (from the product catalog) and transmitted to the user/customer and displayed on the mobile device, computing device, and/or website.

Figure 2:
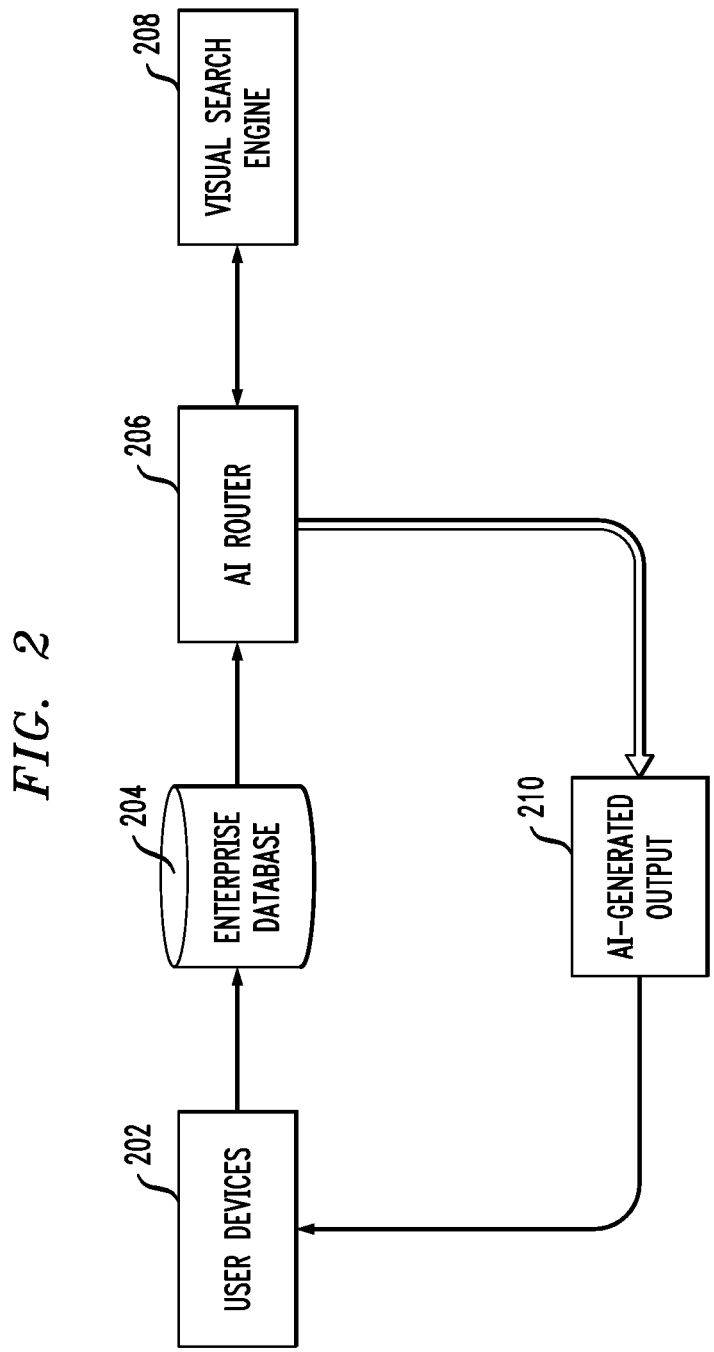
FIG. 2 is a flow diagram of a process for image-based search and recommendation techniques implemented via artificial intelligence in an illustrative embodiment.

FIG. 2 is a flow diagram of a process for image-based search and recommendation techniques implemented via artificial intelligence in an illustrative embodiment. By way of illustration, FIG. 2 depicts user devices 202 (such as smartphones, tablets, laptops, etc.), which are utilized by users to capture images of particular enterprise offerings. The captured images are transmitted (for example, via a software application downloaded on and executed by the user devices 202) to an enterprise database 204. Additionally, an AI router 206 analyzes the captured images stored in the enterprise database 204 and detects, in the images, objects and features thereof. In one or more embodiments of the invention, the AI router 206 encompasses a training model output and the code to run a detection/prediction function for use in real time. Subsequently, a visual search engine 208 returns labels for the product offerings detected (by the AI router 206) in the captured images. Such labels can include, for example, product and features information. In one or more embodiments of the invention, the AI router 206 can also determine a confidence score for each of the labels provided by the visual search engine 208.

As also depicted in FIG. 2, the AI router 206 determines one or more additional offerings related to the offerings corresponding to the returned labels. Such determinations can be based, for example, on product similarity, historical purchase patterns of users, promotions, etc. Based on the returned labels and the determined additional offerings, the AI router 206 pushes an output 210 of the returned labels (and the confidence scores related thereto), along with one or more recommended offerings, to the user devices 202 (via the software application executing thereon).

Figure 3:
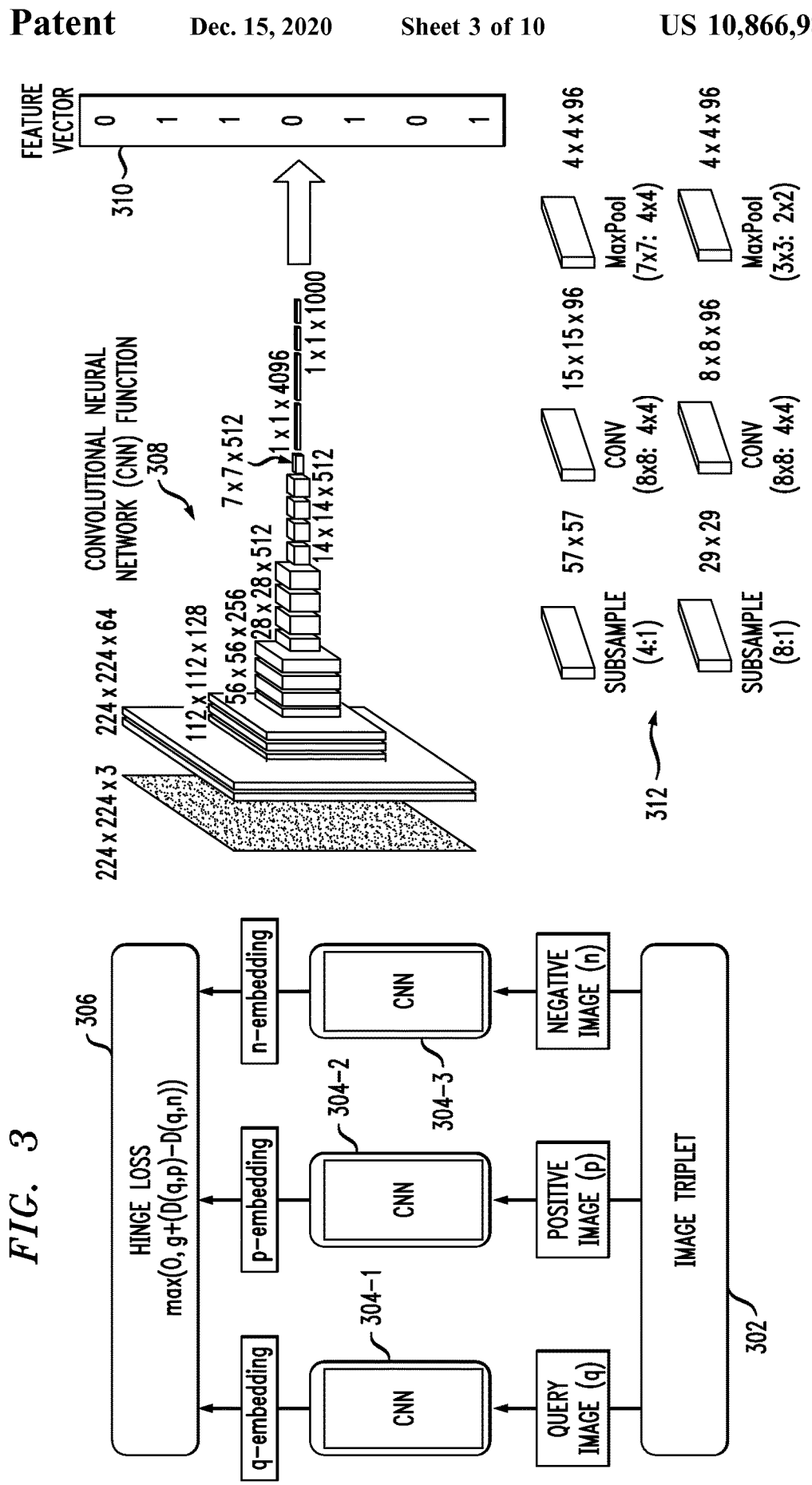
FIG. 3 shows artificial intelligence (AI) training for image-based search and recommendation techniques in an illustrative embodiment.

FIG. 3 shows artificial intelligence training for image-based search and recommendation techniques in an illustrative embodiment. By way of illustration, FIG. 3 depicts a CNN, which is trained using an image triplet 302 and related deep ranking paradigm, and also contains a deep CNN model which is customized and coupled with parallel shallow convolution layers 304-1, 304-2 and 304-3, in order to capture high-level and low-level image details simultaneously.

While training the model, consider an input image as a query image, a similar image as a positive image, and a distinct/different image as a negative image to understand one or more features of the query image. Also, negative images can be used to train the model accurately until the model learns that the negative images are not the same as the query or positive images. Additionally, as illustrated in FIG. 3, to determine the distance between features, hinge loss function 306 can be utilized. In one or more such embodiments, if the system/network behaved correctly, the resulting loss would equal zero, while if the system/network behaved incorrectly, the resulting loss would be greater than zero. Accordingly, the more the system/network deviates from correct behavior, the higher the hinge loss. Additionally, introduction of a non-zero gradient can push the positive and negative images further apart.

As also illustrated, FIG. 3 additionally depicts a CNN function 308, which results in a feature vector 310. CNN function 308 extracts high-level features from the image, such as color, dimensions, etc. CNN function 308 also implements a convolution layer that converts an image from a block of pixels (4×4, for example) to a single pixel via a rectified linear unit (ReLu) activation. Additionally, max pooling can be implemented to partition the image into a set of non-overlapping regions and, for each such sub-region, output the maximum. A fully connected layer can also be carried out via CNN function 308 to learn and classify one or more features, and a softmax function (a loss function) can be used to predict a single class from the multiple classified pixels.

Feature vector 310 maps the list of features available in the product (such as, for example, if color=blue, then 1; else, 0 against rest all colors, etc.), and component 312 extracts low-level features (from the image) such as distance between lines in a carry bag, distance between keys, distance from an edge to a logo, size of a logo, etc. For example, an identified sub-sample can include a key, a logo, etc., and convolution (cony) and max pooling (MaxPool) elements can identify features and/or text available therein.

Figure 4:
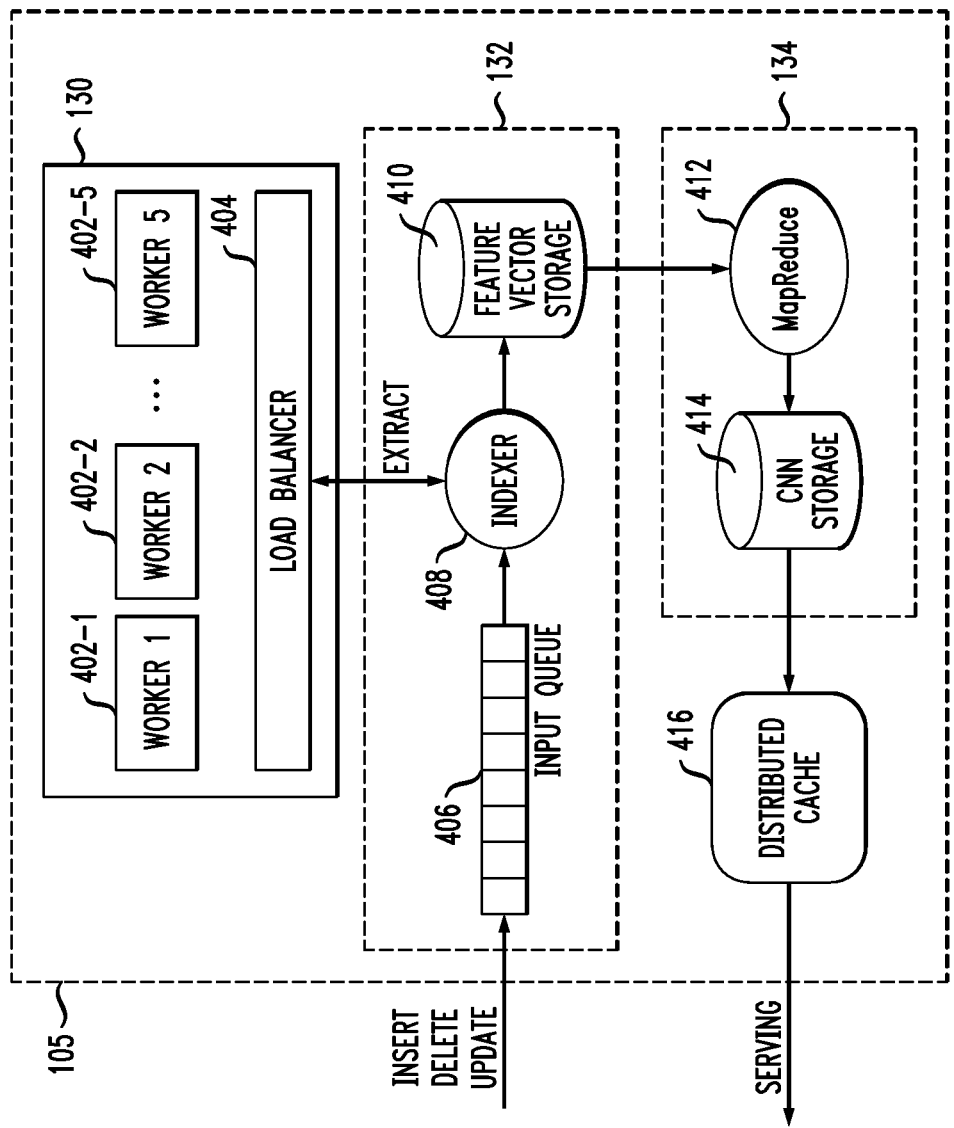
FIG. 4 shows system architecture for an information processing system configured for image-based search and recommendation techniques implemented via artificial intelligence in an illustrative embodiment of the invention.

FIG. 4 shows system architecture for an information processing system configured for image-based search and recommendation techniques implemented via artificial intelligence in an illustrative embodiment of the invention. By way of illustration, FIG. 4 depicts visual search and recommendation system 105 in an example embodiment of the invention, wherein system 105 includes AI-based object detector 130, AI-based feature extractor 132, and offering match identifier 134. In the example embodiment of the invention depicted in FIG. 4, the AI-based object detector includes workers 402-1, 402-2, . . . 402-5 and load balancer 404. The workers (collectively, 402) run the process on a client side, and the load balancer 404 is implemented for efficient distribution and to increase availability of the application for multiple users.

As also depicted in FIG. 4, AI-based feature extractor 132 includes an input queue 406, an indexer 408, and a feature vector storage component 410 (which stores the feature vector output). The input queue 406 can be utilized, for example, during a prediction phase if multiple people are using the application at the same time. Also, in connection with the indexer 408 is utilized while returning the results to match the input image with the resulting feature vectors.

Additionally, the offering match identifier 134 includes a MapReduce component 412 and a CNN storage component 414, and provides output to a distributed cache 416. The MapReduce component 412 helps in processing large sets of data by using parallel processing. The CNN storage component 414 stores the weights generated in each and every layer, which helps in predicting in real-time. Also, the distributed cache 416 serve the role of a cache for quick access of the data over a distributed network.

Figure 5:
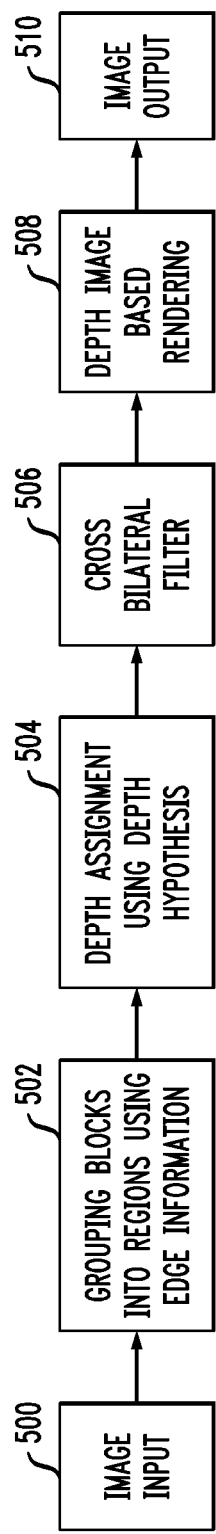
FIG. 5 shows a flow diagram for a two-dimensional (2D) image to three-dimensional (3D) image conversion process in an illustrative embodiment.

FIG. 5 shows a flow diagram for a 2D image to 3D image conversion process in an illustrative embodiment. Step 500 includes obtaining an input 2D image, and step 502 includes grouping, within the input image, blocks into one or more regions using edge information. Step 504 includes carrying out depth assignments (to the grouped regions, identifying depth for the grouped edges) using a depth hypothesis. The extraction of depth is important in the conversion process. In one or more embodiments of the invention, the greatest difference between a 2D image and a 3D image is the depth information. If depth signals are extracted and integrated together, a strong foundation can be built to make 3D images of better and higher quality.

Further, step 506 includes applying a cross-bilateral filter on the top of the depth assignment output, step 508 includes generating a depth image-based rendering of the input image, and step 510 includes outputting a 3D version of the input image.

Figure 6:
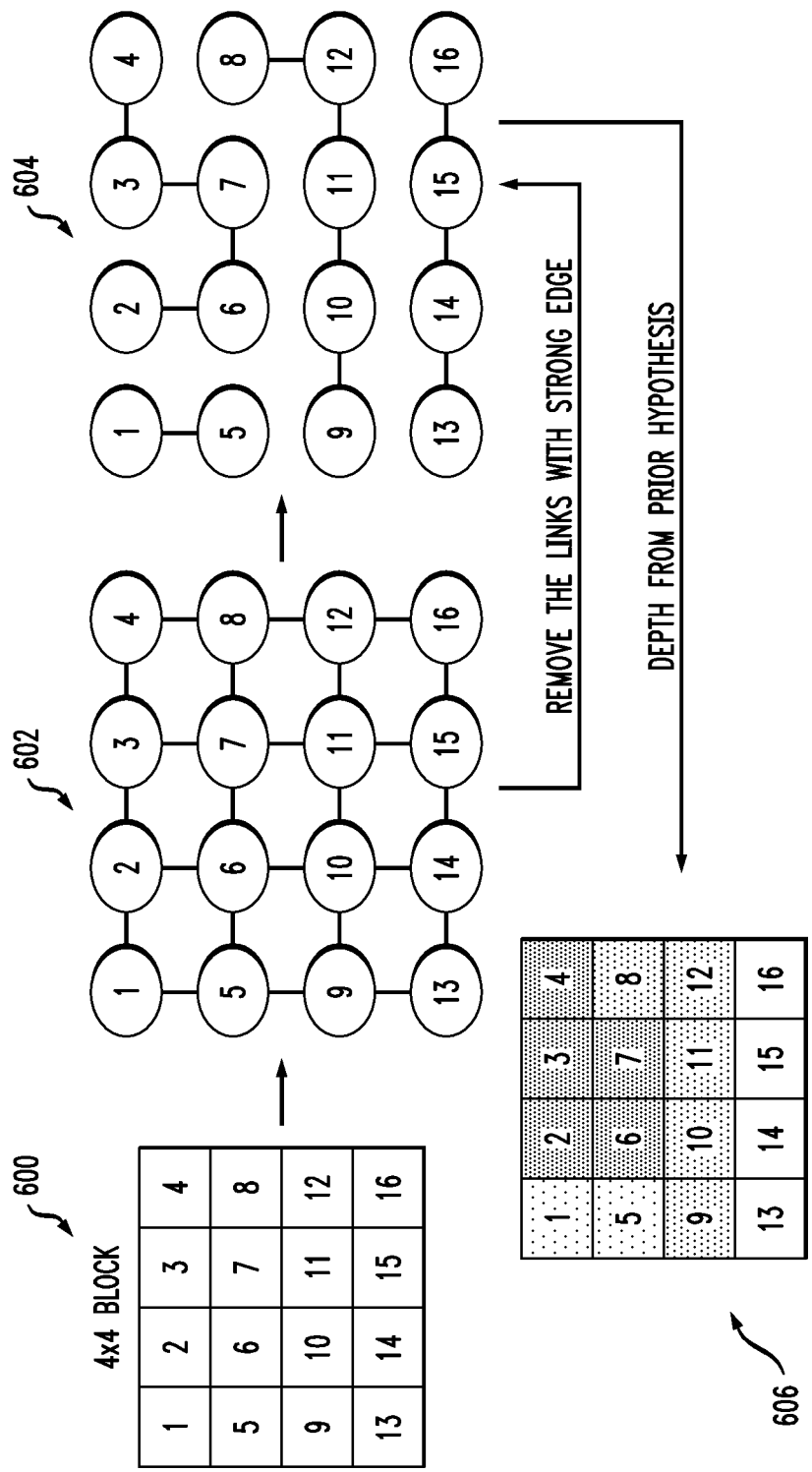
FIG. 6 shows a flow diagram for a grouping and depth identification process in an illustrative embodiment.

FIG. 6 shows a flow diagram for a grouping and depth identification process in an illustrative embodiment. By way of illustration, FIG. 6 depicts a 4×4 block 600 representation of an image, which can be used to generate a linked grouping of blocks 602. As illustrated in FIG. 6, links with a strong edge can be replaced from grouping 602 to create updated grouping 604, which can be used, in conjunction with depth information from a prior hypothesis, to generate a depth image-based rendering 606.

Figure 7:
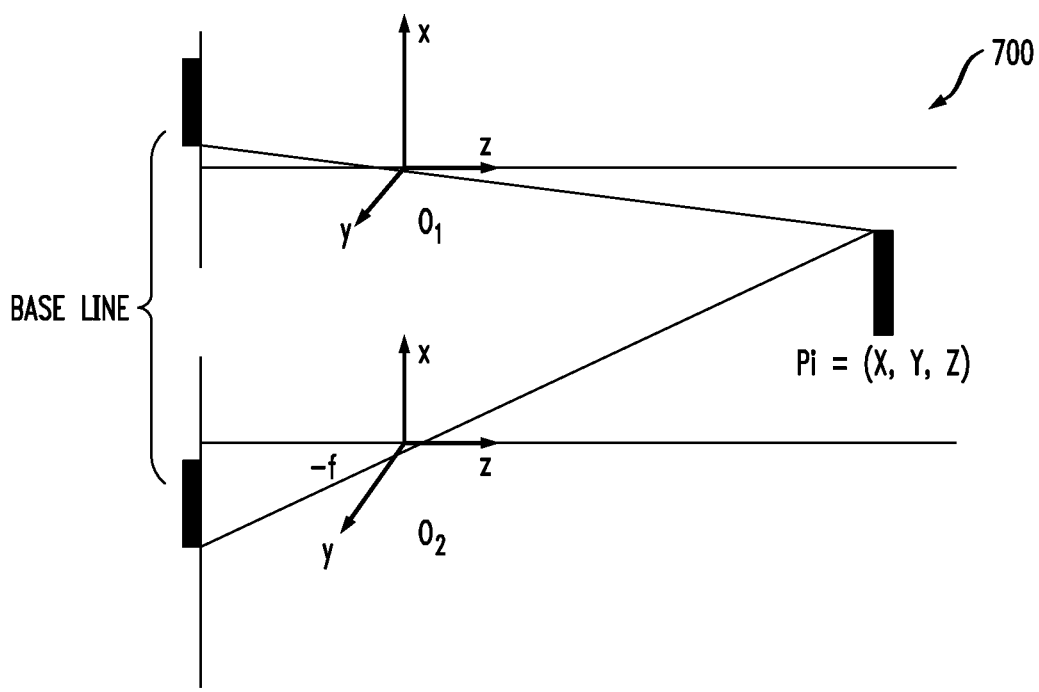
FIG. 7 shows an image-based rendering process for a 2D image to 3D image conversion in an illustrative embodiment.

FIG. 7 shows an image-based rendering process for a 2D image to 3D image conversion in an illustrative embodiment. By way of illustration, FIG. 7 depicts a graphical component 700 and equation set 702. Graphical component 700 combines multiple views, such as, for example, left and right, which vie to obtain 3D visualization for each and every pixel. In an example embodiment, $x_l$ is the horizontal coordinate of the left view, $x_r$ is the horizontal coordinate of the right view, and $x_c$ is the horizontal coordinate of the intermediate view. Z is the depth value of the current pixel, f is the camera focal length, and $t_x$ is the eye distance. The formula shows that 3D warping maps pixels of the intermediate view to that of the left and right view in a horizontal direction. Accordingly, equation set 702 is used to calculate the disparity of the pixel-to-pixel difference or motion between a pair of images (via identifying the Z coordinate).

FIG. 8 shows example pseudocode for CNN execution in an illustrative embodiment. In this embodiment, pseudocode 800 is executed by or under the control of a processing platform, such as visual search and recommendation system 105, or another type of processing platform. For example, the pseudocode 800 may be viewed as comprising a portion of a software implementation of at least part of AI-based object detector 130, AI-based feature extractor 132, and/or offering match identifier 134 of the FIG. 1 embodiment.

The pseudocode 800 illustrates a process for defining a fixed number of classes for image features such as color, dimensions, etc. For each class (value), at least one embodiment of the invention includes determining the distance from another class, which is based on the output from a max pooling layer, and which is used to determine the accurate feature of the product based on training data.

It is to be appreciated that this particular pseudocode shows just one example implementation of a process for image-based searching and recommendation generation, and alternative implementations of the process can be used in other embodiments.

Figure 9:
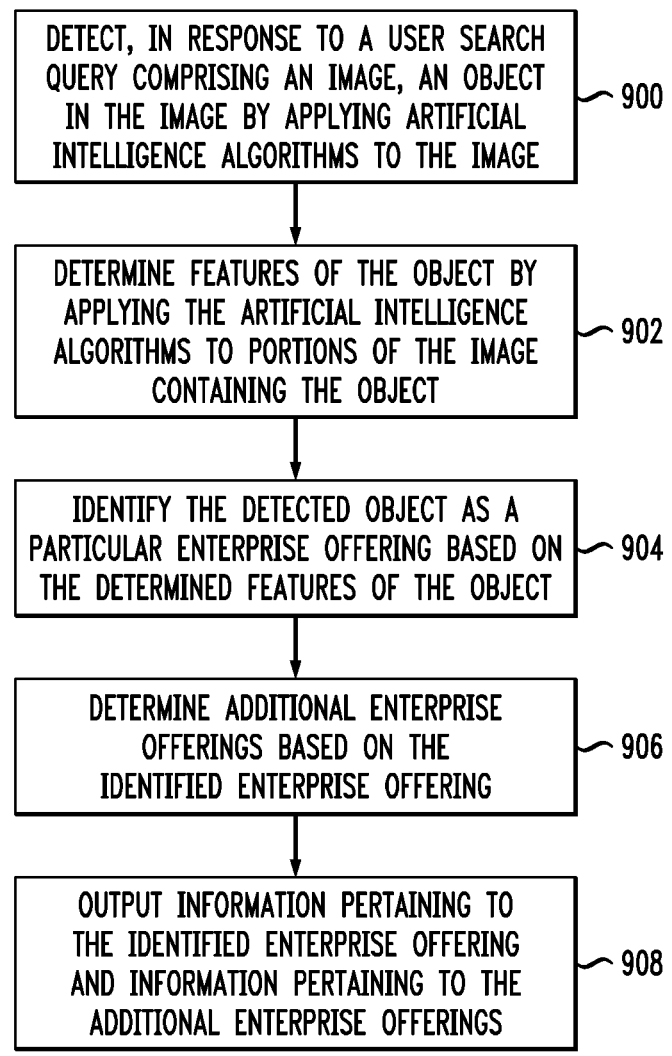
FIG. 9 is a flow diagram of a process for image-based search and recommendation techniques implemented via artificial intelligence in an illustrative embodiment.

FIG. 9 is a flow diagram of a process for image-based search and recommendation techniques implemented via artificial intelligence in an illustrative embodiment. It is to be understood that this particular process is only an example, and additional or alternative processes can be carried out in other embodiments.

In this embodiment, the process includes steps 900 through 908. These steps are assumed to be performed by the processor 120 utilizing its modules 130, 132, 134 and 136.

Step 900 includes detecting, in response to a user search query comprising an image, an object in the image by applying one or more artificial intelligence algorithms to the image. In one or more embodiments of the invention, the one or more artificial intelligence algorithms compare the image to one or more images of known enterprise offerings stored in a database. Such comparing can include comparing one or more colors of the image to one or more colors of the one or more images of known enterprise offerings stored in the database. Additionally, such comparing can include comparing one or more shapes detected in the image to one or more shapes detected in the one or more images of known enterprise offerings stored in the database. Further, such comparing can include comparing one or more one or more visual patterns of the image to one or more visual patterns of the one or more images of known enterprise offerings stored in the database, wherein the one or more visual patterns can include a distance between two or more components within the image.

In at least one embodiment of the invention, the image is a two-dimensional image, and the one or more artificial intelligence algorithms can compare the two-dimensional image to one or more three-dimensional images of known enterprise offerings stored in a database.

Step 902 includes determining one or more features of the object by applying the one or more artificial intelligence algorithms to one or more portions of the image containing at least a portion of the object. Step 904 includes identifying the detected object as a particular enterprise offering based at least in part on the one or more determined features of the object. At least one embodiment of the invention can additionally include determining a confidence score for the identifying of the detected object as a particular enterprise offering.

Step 906 includes determining one or more additional enterprise offerings based at least in part on the identified enterprise offering. Determining the one or more additional enterprise offerings can be further based at least in part on one or more similarities between the identified enterprise offering and the one or more additional enterprise offerings. Additionally, determining the one or more additional enterprise offerings can be further based at least in part on one or more historical purchase patterns of the user. Also, determining the one or more additional enterprise offerings can be further based at least in part on one or more historical purchase patterns of one or more additional users.

Step 908 includes outputting, to the user, information pertaining to the identified enterprise offering and information pertaining to the one or more additional enterprise offerings. The information pertaining to the identified enterprise offering can include a hyperlink to an electronic commerce website of the enterprise wherein the identified enterprise offering is offered for purchase. Additionally, the information pertaining to the one or more additional enterprise offerings can include one or more hyperlinks to one or more electronic commerce websites of the enterprise wherein the one or more additional enterprise offerings are offered for purchase.

The techniques depicted in FIG. 9 can also include training the one or more artificial intelligence algorithms based at least in part on the image and the identified enterprise offering.

Accordingly, the particular processing operations and other network functionality described in conjunction with the flow diagram of FIG. 9 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches.

For example, some embodiments are configured to provide accurate search results based at least in part on various sets of image characteristics, resulting in increased product visibility to users. These and other embodiments can effectively generate an enhanced user experience, including improved product recommendations, leading to increased numbers of page views and sales for enterprises It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
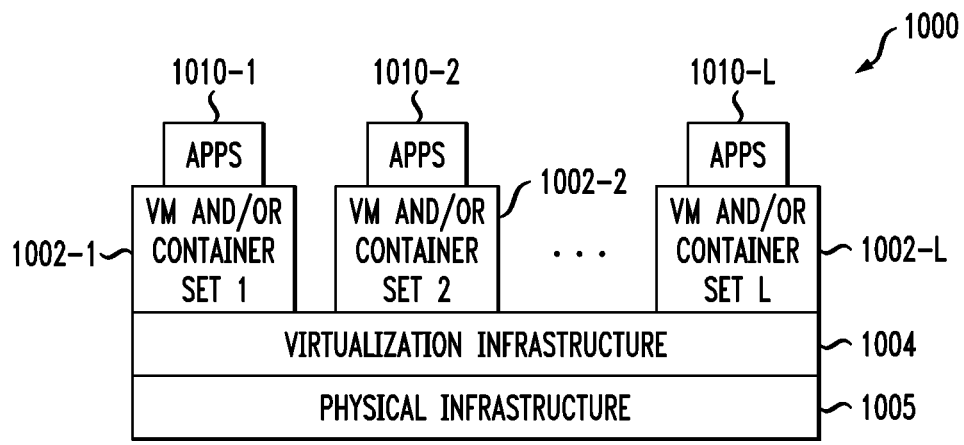
FIGS. 10 and 11 show examples of processing platforms that may be utilized to implement at least a portion of an information processing system in illustrative embodiments.
Figure 11:
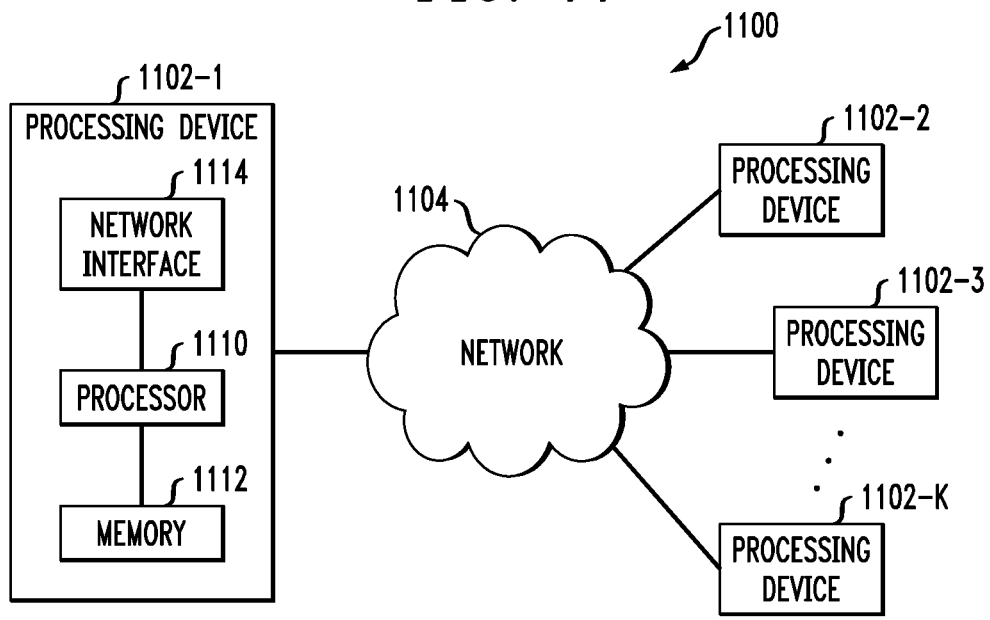

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, ... 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, ... 1010-L running on respective ones of the VMs/container sets 1002-1, 1002-2, ... 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, ... 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and improved user search results and related recommendations. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   detecting, in response to a user search query comprising an image, an object in the image by applying one or more artificial intelligence algorithms to the image;
   determining one or more features of the object by applying the one or more artificial intelligence algorithms to one or more portions of the image containing at least a portion of the object, wherein applying the one or more artificial intelligence algorithms to one or more portions of the image containing at least a portion of the object comprises:
     extracting the one or more features of the object from the one or more portions of the image by processing the one or more portions of the image using at least one convolutional neural network function, wherein using the at least one convolutional neural network function comprises converting the one or more portions of the image from at least one block of multiple pixels to at least one single pixel using at least one rectified linear activation function;
   identifying the detected object as a particular enterprise offering based at least in part on the one or more determined features of the object;
   determining one or more additional enterprise offerings based at least in part on the identified enterprise offering; and
   outputting, to the user, information pertaining to the identified enterprise offering and information pertaining to the one or more additional enterprise offerings;
   wherein the method is performed by at least one processing device comprising a processor coupled to a memory.

2. The computer-implemented method of claim 1, wherein the one or more artificial intelligence algorithms compare the image to one or more images of known enterprise offerings stored in a database.

3. The computer-implemented method of claim 2, wherein comparing comprises comparing one or more colors of the image to one or more colors of the one or more images of known enterprise offerings stored in the database.

4. The computer-implemented method of claim 2, wherein comparing comprises comparing one or more shapes detected in the image to one or more shapes detected in the one or more images of known enterprise offerings stored in the database.

5. The computer-implemented method of claim 2, wherein comparing comprises comparing one or more one or more visual patterns of the image to one or more visual patterns of the one or more images of known enterprise offerings stored in the database.

6. The computer-implemented method of claim 5, wherein the one or more visual patterns comprises a distance between two or more components within the image.

7. The computer-implemented method of claim 1, wherein the image is a two-dimensional image, and wherein the one or more artificial intelligence algorithms compare the two-dimensional image to one or more three-dimensional images of known enterprise offerings stored in a database.

8. The computer-implemented method of claim 1, further comprising:
   determining a confidence score for the identifying of the detected object as a particular enterprise offering.

9. The computer-implemented method of claim 1, further comprising:
   training the one or more artificial intelligence algorithms based at least in part on the image and the identified enterprise offering.

10. The computer-implemented method of claim 1, wherein determining the one or more additional enterprise offerings is further based at least in part on one or more similarities between the identified enterprise offering and the one or more additional enterprise offerings.

11. The computer-implemented method of claim 1, wherein determining the one or more additional enterprise offerings is further based at least in part on one or more historical purchase patterns of the user.

12. The computer-implemented method of claim 1, wherein determining the one or more additional enterprise offerings is further based at least in part on one or more historical purchase patterns of one or more additional users.

13. The computer-implemented method of claim 1, wherein the information pertaining to the identified enterprise offering comprises a hyperlink to an electronic commerce website of the enterprise wherein the identified enterprise offering is offered for purchase.

14. The computer-implemented method of claim 1, wherein the information pertaining to the one or more additional enterprise offerings comprises one or more hyperlinks to one or more electronic commerce websites of the enterprise wherein the one or more additional enterprise offerings are offered for purchase.

15. A non-transitory processor-readable storage medium having stored therein program code of one or more software programs, wherein the program code when executed by at least one processing device causes said at least one processing device:
    to detect, in response to a user search query comprising an image, an object in the image by applying one or more artificial intelligence algorithms to the image;
    to determine one or more features of the object by applying the one or more artificial intelligence algorithms to one or more portions of the image containing at least a portion of the object, wherein applying the one or more artificial intelligence algorithms to one or more portions of the image containing at least a portion of the object comprises:
        extracting the one or more features of the object from the one or more portions of the image by processing the one or more portions of the image using at least one convolutional neural network function, wherein using the at least one convolutional neural network function comprises converting the one or more portions of the image from at least one block of multiple pixels to at least one single pixel using at least one rectified linear activation function;
    to identify the detected object as a particular enterprise offering based at least in part on the one or more determined features of the object;
    to determine one or more additional enterprise offerings based at least in part on the identified enterprise offering; and
    to output, to the user, information pertaining to the identified enterprise offering and information pertaining to the one or more additional enterprise offerings.

16. The non-transitory processor-readable storage medium of claim 15, wherein the one or more artificial intelligence algorithms compare the image to one or more images of known enterprise offerings stored in a database.

17. The non-transitory processor-readable storage medium of claim 15, wherein the image is a two-dimensional image, and wherein the one or more artificial intelligence algorithms compare the two-dimensional image to one or more three-dimensional images of known enterprise offerings stored in a database.

18. An apparatus comprising:
    at least one processing device comprising a processor coupled to a memory;
    the at least one processing device being configured:
        to detect, in response to a user search query comprising an image, an object in the image by applying one or more artificial intelligence algorithms to the image;
        to determine one or more features of the object by applying the one or more artificial intelligence algorithms to one or more portions of the image containing at least a portion of the object, wherein applying the one or more artificial intelligence algorithms to one or more portions of the image containing at least a portion of the object comprises:
            extracting the one or more features of the object from the one or more portions of the image by processing the one or more portions of the image using at least one convolutional neural network function, wherein using the at least one convolutional neural network function comprises converting the one or more portions of the image from at least one block of multiple pixels to at least one single pixel using at least one rectified linear activation function;
        to identify the detected object as a particular enterprise offering based at least in part on the one or more determined features of the object;
        to determine one or more additional enterprise offerings based at least in part on the identified enterprise offering; and
        to output, to the user, information pertaining to the identified enterprise offering and information pertaining to the one or more additional enterprise offerings.

19. The apparatus of claim 18, wherein the one or more artificial intelligence algorithms compare the image to one or more images of known enterprise offerings stored in a database.

20. The apparatus of claim 18, wherein the image is a two-dimensional image, and wherein the one or more artificial intelligence algorithms compare the two-dimensional image to one or more three-dimensional images of known enterprise offerings stored in a database.

* * * * *

UNITED STATES PATENT AND TRADEMARK OFFICE
CERTIFICATE OF CORRECTION

PATENT NO. : 10,866,985 B2
APPLICATION NO. : 16/048787
DATED : December 15, 2020
INVENTOR(S) : Venkata Chandra Sekar Rao et al.

Page 1 of 1

It is certified that error appears in the above-identified patent and that said Letters Patent is hereby corrected as shown below:

In the Claims

Column 14: In Claim 5, Line 2, please delete "one or more" after the word "comparing" and before the word "one".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*